UNITED STATES PATENT OFFICE.

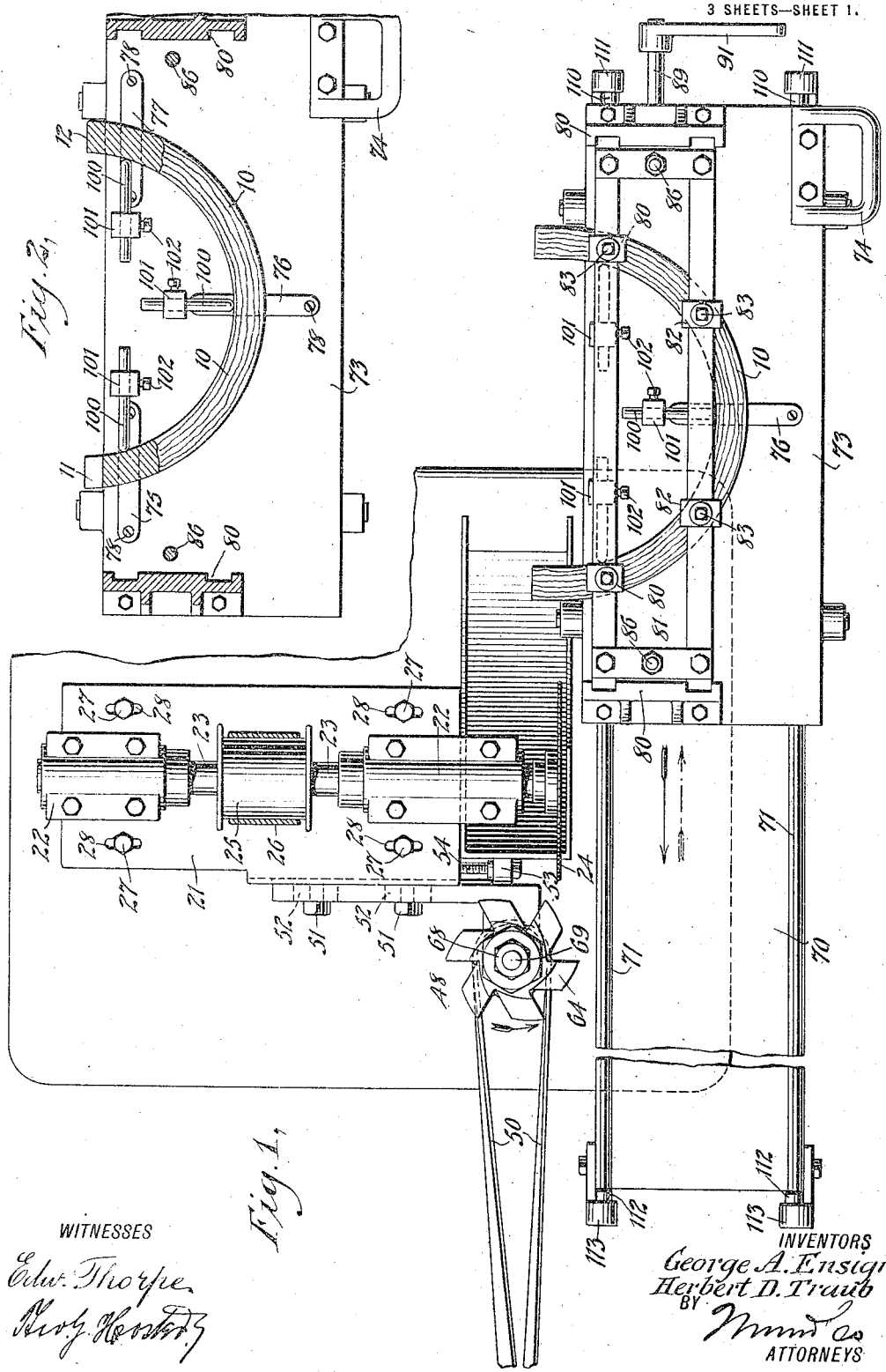

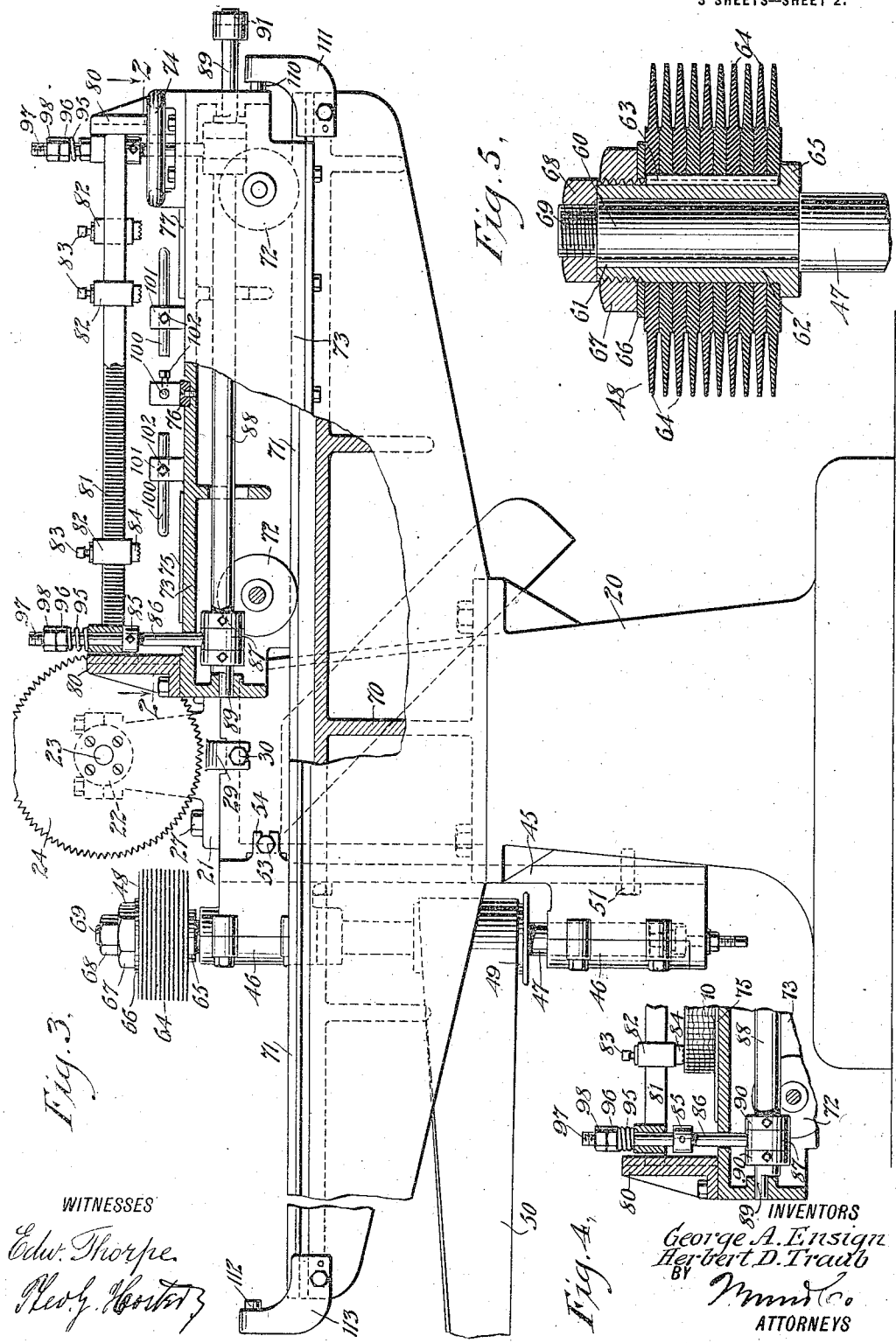

GEORGE A. ENSIGN AND HERBERT D. TRAUB, OF DEFIANCE, OHIO, ASSIGNORS TO DEFIANCE MACHINE WORKS, OF DEFIANCE, OHIO, A CORPORATION OF OHIO.

WHEEL-RIM EQUALIZING AND JOINT-FORMING MACHINE.

1,250,822.  Specification of Letters Patent.  Patented Dec. 18, 1917.

Application filed July 10, 1917. Serial No. 179,673.

*To all whom it may concern:*

Be it known that we, GEORGE A. ENSIGN and HERBERT D. TRAUB, both citizens of the United States, and residents of Defiance, in the county of Defiance and State of Ohio, have invented a new and Improved Wheel-Rim Equalizing and Joint-Forming Machine, of which the following is a full, clear, and exact description.

The invention relates to woodworking machines, and its object is to provide a new and improved wheel rim equalizing and joint forming machine arranged for cutting off the ends of an approximately semicircular wheel rim stock to reduce the latter to a true semicircular shape and to form joints on the ends of the stock to permit of joining two rim sections in an accurate manner. Another object is to form the tongues of the joining members at one end of the semicircular rim section in alternate relation with the tongues at the other end of the rim section to permit of joining two rim sections, with the outer and inner faces thereof of practically unbroken continuity, to insure a subsequent easy and proper rounding of the rim.

In order to accomplish the desired result use is made of a circular saw, a revoluble cutter head to one side of the said circular saw and having its axis at a right angle to the axis of the circular saw, and a carriage adapted to hold the wheel rim section and mounted to travel sidewise in front of the said circular saw and the said cutter head to successively cut off the ends of the wheel rim section by the action of the said circular saw and to provide the terminals of the wheel rim section with tongues and grooves by the action of the said cutter head. Use is also made of means for supporting a wheel rim section in a tilted position in the carriage so that the cutter head provides the ends of the rim section with tongues of which the tongues in one end are in alternate relation with the tongues at the other end of the rim section.

A practical embodiment of the invention is represented in the accompanying drawings forming a part of this specification, in which similar characters of reference indicate corresponding parts in all the views.

Figure 1 is a plan view of the wheel rim equalizing and joint forming machine with the driving belt shown in section;

Fig. 2 is a sectional plan view of the carriage on the line 2—2 of Fig. 3 and with the wheel rim section shown in position and the ends of the wheel rim section shown in section and provided with tongues and grooves produced by the cutter head;

Fig. 3 is a front elevation of the wheel rim equalizing and joint forming machine with parts in section;

Fig. 4 is a sectional front elevation of a portion of the carriage and showing the parts in a different position from the one shown in Fig. 3;

Fig. 5 is an enlarged sectional side elevation of the revoluble cutter head;

Figure 6:
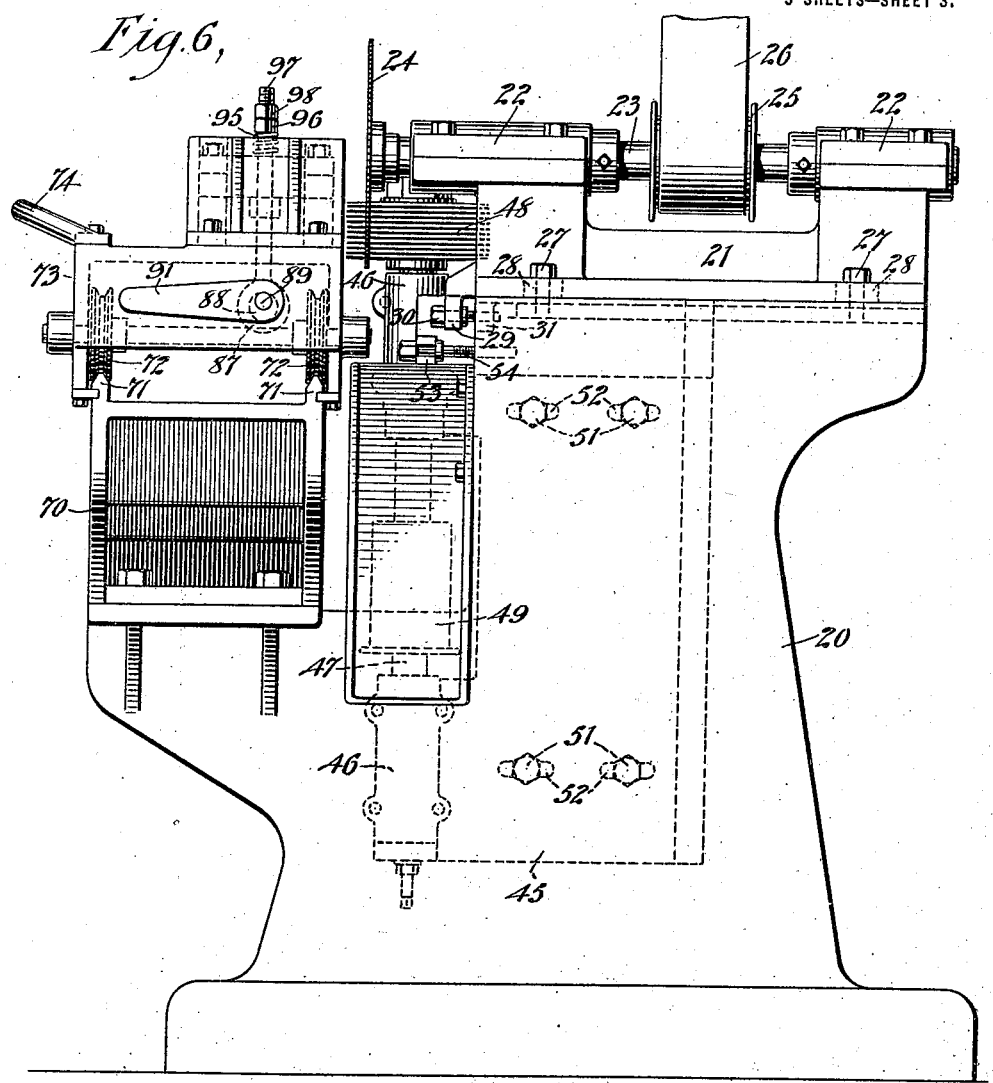
Fig. 6 is an end elevation of the wheel rim equalizing and joint forming machine.
Figure 7:
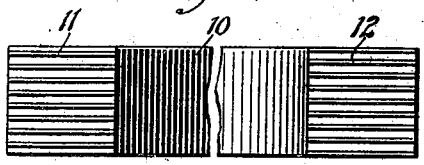
Fig. 7 is an edge view of a wheel rim section provided with tongues and grooves at the ends.
Figure 8:
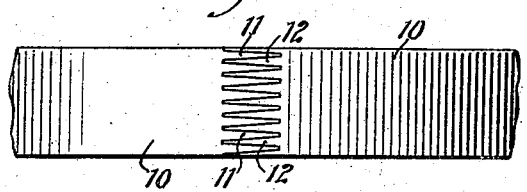
Fig. 8 is an edge view of the joint formed by two connected wheel rim sections.

In making wooden wheels such as are used as the steering wheels for automobiles and other vehicles, the rim of the wheel is preferably made in two sections of semi-circular shape and provided at the ends with interlocking tongues usually glued together. The stock for each wheel rim section is usually square in cross section and the stock is bent into an approximately semicircular shape with the ends usually extended beyond a half circle, as plainly indicated in Fig. 1. With the machine presently described in detail the projecting ends of a wheel rim section 10 are cut off and the ends of this wheel rim section 10 are then provided with tongues 11 and 12 of which the tongues 11 at one end are in alternate relation with the tongues 12 on the other end (see Fig. 6) so that two wheel rim sections by reversely joining the ends together (see Fig. 7) provide a rim without undesirable projections on the outer and inner faces of the rim. The equalizing and joint forming machine is mounted on a suitably constructed frame 20 on top of which is secured a bearing block 21 provided with bearings 22 in which is journaled a transversely extending shaft 23 provided at its forward end with a circular saw 24. On the shaft 23 intermediate the bearings 22 is secured a pulley 25 connected by a belt 26 with other machinery for imparting a continuous rotary motion to the shaft 23 to rotate the circular saw 24. The bearing block 21 is preferably adjustably mounted on the frame 20 in a transverse direction by the use of screws 27 extending through elongated slots 28 formed in the block 21, the screws 27 screwing into the top of the frame 20. The front end of the bearing block 21 is provided with a lug 29 in which is mounted to turn an adjusting bolt 30 screwing in a nut 31 attached to or forming part of the frame 20. On loosening the bolts 27 and turning the adjusting screw 30 the bearing block 21 may be moved rearward or forward and when the desired position is reached then the bolts 27 are screwed up to securely fasten the block 21 in position on the frame 20 thus maintaining the circular saw 24 in proper relation to the ends of the wheel rim section 10 to be cut off, as hereinafter more fully described. On the left hand side of the main frame 20 is secured a bearing block 45 provided with vertically disposed bearings 46 in which is journaled a vertical shaft 47 provided at its upper end with a cutter head 48 disposed to the left hand side of the circular saw 24. This cutter head 48 is adapted to provide the ends of the rim section 10 with the alternately disposed tongues 11 and 12 previously mentioned. On the shaft 47 is secured a pulley 49 connected by belt 50 with other machinery for imparting a continuous rotary motion to the shaft 47 and its cutter head 48. The bearing block 45 is secured adjustably in a transverse direction on the main frame 20 by the use of bolts 51 extending through elongated openings 52 (see Fig. 6) formed in the bearing block 45, the bolts screwing into the main frame 20. The front end of the bearing block 45 is provided near its upper end with a lug 53 in which is mounted to turn an adjusting screw 54 screwing into the main frame 20 so that on loosening the bolts 51 and turning the adjusting screw 54 the bearing block 45 can be adjusted in a transverse direction and with it the cutter head 48.

The cutter head 48 is preferably constructed as follows, special reference being had to Fig. 5. The shaft 47 is provided at its upper end with a reduced portion 60 on which is fastened by a key 61 a bushing 62 on which are fastened by a key 63 a series of circular cutters 64 disposed one above the other with the cutting edges spaced apart to provide the ends of the rim section 10 with tongues 11 and 12. The lowermost cutter 64 rests on a shoulder 65 formed on the bushing 62, and the uppermost cutter 64 is engaged by a washer 66 on which bears a nut 67 screwing on the upper end of the bushing 62. A nut 68 screws in the outer threaded end 69 of the shaft 47 to hold the bushing 62 in place on the reduced end 60 of the shaft 47.

On the front of the main frame 20 is bolted or otherwise secured a bed 70 provided with sidewise extending guideways 71 on which are mounted to travel wheels 72 journaled on a carriage 73 provided at the front near the right-hand side with a handle 74 adapted to be taken hold of by the operator for imparting a sidewise traveling motion to the carriage 73. The carriage 73 is provided on the top with three rests 75, 76 and 77 fastened in place by screws 78. The rests 75 and 77 are arranged in lengthwise alinement near the rear edge of the carriage 73 while the rest 76 is disposed in a transverse direction in a line approximately intermediate the rests 75 and 77. The rests 75, 76 and 77 are of different heights and project different distances above the surface of the carriage 73, as will be readily understood by reference to Fig. 3, to permit of giving a slight twist to the wheel rim section 10 to hold one end thereof in a different plane from that of the other end, the difference in the planes corresponding to one half the distance at which the cutters 64 are spaced apart to provide one end of the rim section 10 with the tongues 11 and the other end with the tongues 12 in alternate relation with the tongues 11.

In order to give this slight twist to the rim section 10 and to securely hold the same in position on the rests 75, 76 and 77 during the equalizing and joint forming operation, use is made of a clamping device constructed as follows: The sides of the carriage 73 are provided with vertically disposed guideways 80 in which is mounted to slide up and down a clamping frame 81 provided with clamping blocks 82 mounted to slide sidewise and adapted to be fastened in place by set screws 83. The lower ends 84 of the clamping blocks 82 are preferably notched and adapted to engage the top of the rim section 10 at the top thereof, as will be readily understood by reference to Fig. 1, it being, however, essential that the two rearmost blocks 82 are disposed directly above the rests 75 and 77 while the front blocks 82 are preferably disposed on opposite sides of the rest 76. The sides of the clamping frame 81 are adapted to rest on collars 85 secured on upwardly extending rods 86 provided at their lower ends with bearings 87 engaging a crank 88 on a crank shaft 89 journaled in the ends of the carriage 73. The bearings 87 are held between collars 90 secured on the crank 88 to hold the bearings against sidewise movement. The right hand end of the crank shaft 89 is provided with a suitable handle 91 under the control of the operator for imparting a turning motion to the crank shaft with a view to move the rods 86 upward or downward according to the direction in which the handle 91 is turned at the time. On the upper portions of the rods 86 are coiled springs 95 resting on the top of the sides of the clamping frame 81 and abutting at their upper ends against nuts 96 screwing on the upper threaded ends 97 of the rods 86. By adjusting the nuts 96, the tension of the springs 85 can be increased or diminished, and after the tension of the springs has been adjusted then the lugs 96 are locked in place by lock nuts 98 screwing on the threaded ends 97 of the rods 86.

In order to enable the operator to quickly center the wheel rim section 10 on top of the rests 75, 76 and 77, use is made of centering rods 100 adapted to engage the inner face of the wheel rim section 10 and held adjustable in lugs 101 by the use of set screws 102. By the arrangement described the operator can quickly slide a wheel rim section 10 in position on the rests 75, 76 and 77 to project the ends of said section equal distances beyond the rear edge of the carriage 73 to dispose the projecting ends in the path of the circular saw 24 and that of a cutter head 48.

When placing a rim section 10 in position on the rests 75, 76 and 77, the clamping frame 81 is in raised position, and after the rim section is in place the operator turns the crank shaft 89 to move the clamping frame 81 downward and thus move the clamping blocks 82 in contact with the upper face of the rim section 10. During the downward movement of the rods 86 the collars 85 move out of engagement with the clamping frame 81 and the springs 95 are compressed so as to cause the clamping blocks 82 to bear yieldingly on the rim section 10 with a view to give the same the slight twist previously mentioned on pressing the rim section in firm contact with the rests 75, 76 and 77.

The rim section 10 is placed in position on the carriage 73 in the manner described at the time the carriage is in right hand position as shown in the drawings, and then the operator takes hold of the handle 74 and imparts a traveling motion to the carriage from the right to the left whereby the left hand end of the clamped rim section 10 is first moved in engagement with the circular saw 24 whereby this end is cut off, and on further movement of the carriage to the left this left hand end of the rim section 10 is cut by the cutter head 48 to form the tongues 11. On further movement of the carriage 73 to the left the circular saw 24 cuts off the right hand end of the rim section 10, and the cutter head 48 finally provides this right hand end with the tongues 12 alternating with the tongues 11. The carriage 73 is then returned to its right hand position and the operator turns the crank shaft 89 to its original position whereby the clamping frame 81 is raised by the collars 85 and the clamping blocks 82 move out of engagement with the rim section 10. The latter is now removed from the carriage and another one is placed in position thereon and the above described operation is repeated.

The movement of the carriage 73 to the right is limited by bumpers 110 held on brackets 111 bolted to the bed 70, and the movement of the carriage 73 to the right is limited by a bumper 112 held on brackets 113 fastened to the left hand side of the bed 70.

From the foregoing it will be seen that it is only necessary for the operator to clamp a rim section in position on the carriage and to move the latter first to the left and back again to the right and then to unclamp and remove the rim section and replace the same by another to be cut off at the ends and provided with tongues 11 and 12, as above explained. It is understood that after the rim section is removed from the machine it readily untwists and returns to its original untwisted shape.

Two rim sections provided with tongues as described can be readily jointed by reversing one rim section relative to the other, that is, engaging the tongues 12 of one rim section with the grooves between the tongues 11 of the other rim section (see Fig. 7) thus presenting no undesirable projections on the outer and inner faces of the wheel rim. It is understood that the wheel rim is subsequently rounded off in the usual manner.

Having thus described our invention, we claim as new and desire to secure by Letters Patent:—

1. A wheel rim equalizing and joint forming machine, comprising a single circular saw, a single joint cutter head to one side of the said circular saw and having its axis at a right angle to the axis of the said circular saw, and a carriage adapted to hold a wheel rim section and mounted to travel sidewise in one direction in front of the said circular saw and the said cutter head to successively cut off both ends of the wheel rim section by the action of the said circular saw, the carriage being provided with a support for the wheel rim section to rest on and having the plane of its supporting face inclined to the plane of movement of the said carriage to provide the terminals of the wheel rim section with tongues and grooves by the action of the said cutter head, and while the carriage travels in the said direction.

2. A wheel rim equalizing and joint forming machine, comprising a single circular saw having its axis disposed horizontally, a single revoluble joint cutter head located to one side of the said circular saw and having its axis disposed vertically, a carriage mounted to travel sidewise in one direction in front of the said circular saw and the said cutter head, and means clamping a wheel rim section in position on the carriage with the ends projecting rearwardly beyond the carriage and into the paths of the said circular saw and the said cutter head, the said means having the plane of its supporting face inclined to the plane of movement of the said carriage.

3. A wheel rim equalizing and joint forming machine, comprising a single circular saw having its axis disposed horizontally, a single revoluble joint cutter head located to one side of the said circular saw and having its axis disposed vertically, a carriage mounted to travel sidewise in one direction in front of the said circular saw and the said cutter head and provided with a support having the plane of its supporting face inclined to the plane of movement of the said carriage, the said supporting face being adapted to support a wheel rim in an inclined position and means holding the wheel rim in position on the said support.

4. A wheel rim equalizing and joint forming machine, comprising a circular saw having its axis disposed horizontally, a revoluble joint cutter head located to one side of the said circular saw and having its axis disposed vertically, a carriage mounted to travel sidewise in front of the said circular saw and the said cutter head and provided with spaced rests of different heights to support a wheel rim section in a tilted position, and clamping means clamping the wheel rim section on the said rests.

5. A wheel rim equalizing and joint forming machine, comprising a circular saw having its axis disposed horizontally, a revoluble joint cutter head located to one side of the said circular saw and having its axis disposed vertically, a carriage mounted to travel sidewise in front of the said circular saw and the said cutter head and provided with rests of different heights to support a wheel rim section in a tilted position, and a clamping frame mounted to slide up and down on the carriage and provided with bearing blocks adapted to bear down on the wheel rim section.

6. A wheel rim equalizing and joint forming machine, comprising a circular saw having its axis disposed horizontally, a revoluble joint cutter head located to one side of the said circular saw and having its axis disposed vertically, a carriage mounted to travel sidewise in front of the said circular saw and the said cutter head and provided with rests of different heights to support a wheel rim section in a tilted position, a clamping frame slidable up and down on the carriage and provided with bearing blocks adapted to bear down on the wheel rim section, springs bearing down on the said clamping frame, and manually controlled means mounted on the carriage and adapted to lift the said clamping frame and to compress the said springs.

7. A wheel rim equalizing and joint forming machine provided with a carriage having rests of different heights to support a wheel rim section in a tilted position, and a revoluble cutter head adapted to engage the ends of the wheel rim section to provide the same with tongues and grooves, the tongues on one end being in alinement with the grooves at the other end.

8. In a wheel rim and equalizing joint forming machine, the combination of a revoluble cutter head and a support adapted to support a wheel rim, the said cutter head and the said support having movement one relative to the other to engage the ends of the wheel rim section with the said cutter head, the said support having means inclined to the plane of the said relative movement of the cutter head and the support to support the wheel rim section in a tilted position.

9. A wheel rim equalizing and joint forming machine, comprising a cutting tool and a carriage adapted to be moved sidewise in front of the cutting tool, a clamping frame slidable on the said carriage and provided with clamping blocks adapted to engage and clamp a wheel rim section in position on the frame, a crank shaft mounted to turn on the frame, rods held on the crank shaft and engaging the said clamping frame, the rods being provided with collars for the clamping frame to rest on, and springs on the rods and bearing on the said clamping frame.

10. The herein described method for providing semicircular wheel rim stock with tongues and grooves at each end consisting in restraining the ends of the stock in different planes and successively subjecting the ends to cutting actions by parallel cutters maintained in the same plane during the cutting operation to provide one end of the stock with tongues disposed in alternate relation with the tongues at the other end of the stock.

GEORGE A. ENSIGN.
HERBERT D. TRAUB.

Copies of this patent may be obtained for five cents each, by addressing the "Commissioner of Patents. Washington, D. C."